United States Patent
Lee et al.

(10) Patent No.: US 9,497,812 B2
(45) Date of Patent: Nov. 15, 2016

(54) CIRCUITS FOR DRIVING LIGHT SOURCES

(71) Applicant: O2Micro Inc., Santa Clara, CA (US)

(72) Inventors: Sheng-Tai Lee, Taipei (TW); Ching-Shuan Kuo, Taipei (TW)

(73) Assignee: O2Micro, Inc., Santa Clara, CA (US)

( * ) Notice: Subject to any disclaimer, the term of this patent is extended or adjusted under 35 U.S.C. 154(b) by 0 days.

(21) Appl. No.: 14/742,388

(22) Filed: Jun. 17, 2015

(65) Prior Publication Data

US 2016/0143095 A1     May 19, 2016

(30) Foreign Application Priority Data

Nov. 14, 2014   (CN) .......................... 2014 1 0648884

(51) Int. Cl.
   *H05B 33/08*   (2006.01)

(52) U.S. Cl.
   CPC .......... *H05B 33/083* (2013.01); *H05B 33/089* (2013.01); *H05B 33/0812* (2013.01)

(58) Field of Classification Search
   CPC ............ H05B 33/083; H05B 33/0812; H05B 33/089
   USPC ....................................... 315/122
   See application file for complete search history.

(56) References Cited

U.S. PATENT DOCUMENTS

| | | | |
|---|---|---|---|
| 7,081,722 B1 * | 7/2006 | Huynh ............... | H05B 33/0818 315/185 S |
| 8,384,311 B2 * | 2/2013 | Gray ................. | H05B 33/0824 315/185 R |
| 8,686,651 B2 * | 4/2014 | Lynch ................ | H05B 33/0818 315/192 |
| 8,896,235 B1 | 11/2014 | Shum et al. | |
| 8,907,583 B1 | 12/2014 | Huang et al. | |
| 9,220,140 B2 * | 12/2015 | Liu ....................... | H05B 33/083 |
| 9,301,353 B2 * | 3/2016 | Park ...................... | H05B 33/08 |
| 2007/0170876 A1 * | 7/2007 | Ito ...................... | H05B 33/0893 315/312 |
| 2010/0164403 A1 * | 7/2010 | Liu ..................... | H05B 33/086 315/297 |
| 2010/0194298 A1 * | 8/2010 | Kuwabara ............ | H05B 33/083 315/186 |
| 2011/0109245 A1 * | 5/2011 | Lin .................... | H05B 33/0815 315/294 |
| 2011/0248648 A1 * | 10/2011 | Liu ...................... | G09G 3/3406 315/294 |
| 2012/0280622 A1 * | 11/2012 | Jeong .................. | H05B 33/083 315/122 |
| 2013/0043799 A1 * | 2/2013 | Siu ..................... | H05B 33/0824 315/193 |
| 2014/0184078 A1 * | 7/2014 | Hwang ................ | H05B 33/083 315/122 |
| 2015/0195874 A1 | 7/2015 | Kang | |
| 2015/0382420 A1 | 12/2015 | Sakai et al. | |

* cited by examiner

*Primary Examiner* — Dylan White

(57) ABSTRACT

A light source driving circuit for powering a first light source and a second light source by a DC voltage includes a first current regulator, a second current regulator and a controller. The first current regulator controls a first switch coupled to the first light source based on a first current reference and a first sensing signal. The second current regulator controls a second switch coupled to the second light source based on a second current reference and a second sensing signal. The controller regulates the current through the first light source and the current through the second light source by controlling the first current regulator and the second current regulator. If the DC voltage is within a first range, then the controller turns on the first light source. If the DC voltage is within a second range, then the controller turns on the first light source and the second light source.

16 Claims, 4 Drawing Sheets

CIRCUITS FOR DRIVING LIGHT SOURCES

RELATED APPLICATION

The present application claims priority to Chinese Patent Application No. 201410648884.1, titled "Light Source Driving Circuits and Control Circuits for Controlling Power of Light Sources," filed on Nov. 14, 2014 with the State Intellectual Property Office of the People's Republic of China (SIPO).

BACKGROUND

Light-emitting diodes (LEDs) can be used in many applications such as general lighting. LEDs offer several advantages over traditional light sources such as fluorescent lamps and incandescent lamps. For example, LEDs have significantly lower power consumption. Unlike traditional light sources such as incandescent light bulbs that convert a significant amount of electrical current heating up metal filaments to a temperature high enough to generate light, LEDs generate virtually no heat and utilize a fraction of the energy to produce an equivalent lumen of lighting. For example, in a light bulb, an LED light source may consume less than seven Watts to produce the same amount of brightness as an incandescent light source consuming approximately 60 Watts.

Furthermore, the operational life of an LED can be extended to over 50,000 hours, which is significantly longer than the average life of an incandescent bulb, e.g., 5000 hours, and the average life of a fluorescent lamp, e.g., 15,000 hours. Moreover, LEDs contain no mercury or any other hazardous materials or chemicals and emit zero ultraviolet (UV) radiation unlike incandescent or fluorescent lamps. The use of the LEDs materially enhances the environment and conserves energy.

Conventionally, an AC/DC converter converts an AC (alternating current) voltage to a substantial DC (direct current) voltage to power the LEDs. FIG. 1 illustrates a conventional driving circuit 100 for driving a light source 120, e.g., an LED array. The driving circuit 100 includes a rectifier 104, a capacitor 106, a control unit 108 (e.g., an operational amplifier), a switch 110 coupled in series with the light source 120, and a current sensor 114 (e.g., a resistor). The rectifier 104 can be a bridge rectifier including four diodes for rectifying an AC voltage $V_{AC}$ from a power source 102 to a rectified AC voltage. The capacitor 106 filters the rectified AC voltage and provides a substantially constant DC voltage $V_{DC}$. The capacitor 106 can be an electrolytic capacitor which is relatively large in size. The current sensor 114 senses a current through the light source 120 and provides a sensing signal 116 to the control unit 108. The control unit 108 linearly controls the switch 110 based on a preset current reference 112 and the sensing signal 116 to control the current through the light source 120.

The drawback of the conventional driving circuit 100 is that the power efficiency of the driving circuit 100 decreases (e.g., from 84% to 71%) if the input AC voltage increases (e.g., from 210V to 250V). In other words, a greater input AC voltage can result in larger power loss and poor heat dissipation.

SUMMARY

Embodiments in accordance with the present invention provide circuits for driving light sources, e.g., light-emitting diode (LED) light sources.

In one embodiment, a light source driving circuit for driving a first light source and a second light source includes a rectifier, a capacitor, a first switch, a first current sensor, a first current regulator, a second switch, a second current sensor, a second current regulator and a controller. The rectifier is operable for rectifying an AC voltage to a rectified AC voltage. The capacitor is coupled to the rectifier and is operable for filtering the rectified AC voltage and providing a DC voltage. The first switch is coupled to the first light source. The first current sensor is coupled to the first light source and is operable for sensing a current flowing through the first light source and providing a first sensing signal. The first current regulator is coupled to the first light source and is operable for controlling the first switch to regulate the current flowing through the first light source based on a first current reference and the first sensing signal. The second switch is coupled to the second light source. The second current sensor is coupled to the second current source and is operable for sensing a current flowing through the second light source and providing a second sensing signal. The second current regulator is coupled to the second light source and is operable for controlling the second switch to regulate the current flowing through the second light source based on a second current reference and the second sensing signal. The controller is coupled to the first current sensor and the second current sensor and is operable for regulating the current flowing through the first light source and the current flowing through the second light source by controlling the first current regulator and the second current regulator. If the DC voltage is within a first range, then the controller turns on the first light source. If the DC voltage is within a second range, then the controller turns on the first light source and the second light source.

In another embodiment, a light source driving circuit for powering a first light source and a second light source by a DC voltage includes a first current regulator, a second current regulator and a controller. The first current regulator is coupled to the first light source and is operable for controlling a first switch coupled to the first light source based on a first current reference and a first sensing signal indicating a current flowing through the first light source. The second current regulator is coupled to the second light source and is operable for controlling a second switch coupled to the second light source based on a second current reference and a second sensing signal indicating a current flowing through the second light source. The controller is operable for regulating the current flowing through the first light source and the current flowing through the second light source by controlling the first current regulator and the second current regulator. If the DC voltage is within a first range, then the controller turns on the first light source. If the DC voltage is within a second range, then the controller turns on the first light source and the second light source.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 2:
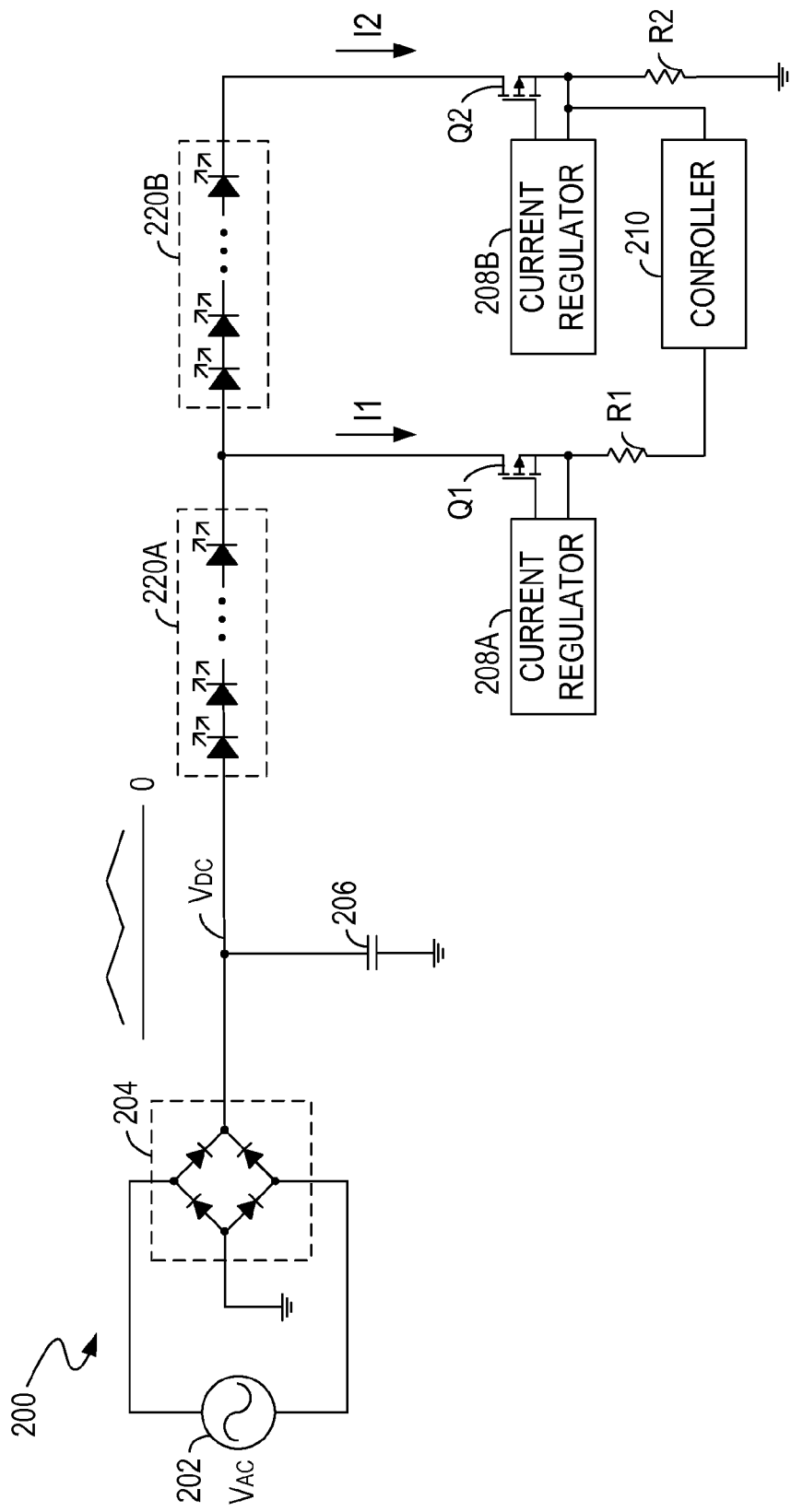
FIG. 2 shows a light source driving circuit, in accordance with one embodiment of the present invention.

FIG. 2 shows a light source driving circuit 200, in accordance with one embodiment of the present invention. The driving circuit 200 controls the power of the light sources (e.g., a first LED string 220A and a second LED string 220B). Each LED string of the LED string 220A and LED string 220B includes multiple LED coupled in series. For example, LED string 220A includes 15 LEDs and LED string 220B includes 3 LEDs. The number of LEDs in each LED is for exemplary purpose rather than limitation. In another example, the light sources can include four LED strings, and the ratio of the number of LEDs in each LED string can be 6:12:12:8. Furthermore, the LED string 220A and LED string 220B can be regarded as one LED string with a tap point. In one example, the switch Q1 and Q2 in FIG. 2 can be power metal-oxide-semiconductor field-effect transistors (MOSFETs).

In the example of FIG. 2, the driving circuit 200 includes a rectifier 204, a capacitor 206, a first current regulator 208A, a second current regulator 208B, a switch Q1 coupled in series with the LED string 220A, a switch Q2 coupled in series with the LED string 220B, current sensors (e.g., a first current sensing resistor R1 and a second current sensing resistor R2), and a controller 210. The rectifier 204 can be a bridge rectifier including four diodes. The rectifier 204 rectifies an AC voltage $V_{AC}$ from a power source 202 to a rectified AC voltage. The capacitor 206 filters the rectified AC voltage and provides a substantially constant DC voltage $V_{DC}$. The waveform of the DC voltage $V_{DC}$ is shown in FIG. 2. The capacitor 106 can be an electrolytic capacitor which is relatively large in size. The current sensor R1 senses a current through the LED string 220A and provides a sensing signal to the current regulator 208A. The current sensor R2 senses a current through the LED string 220B and provides a sensing signal to the current regulator 208B. A control circuitry including the current regulator 208A, the current regulator 208B, and the controller 210 controls the switches Q1 and Q2 to control the current through the LED string 220A and/or the LED string 220B.

In operation, if the DC voltage $V_{DC}$ is greater than the forward voltage of the LED string 220A and less than a sum of the forward voltage of the LED string 220A and the forward voltage of the LED string 220B, the current regulator 208A linearly controls the switch Q1, and the current regulator 208B turns off the switch Q2. Accordingly, the current through the LED string 220A is regulated to a first value I1, and the current through the LED string 220B is zero. If the DC voltage $V_{DC}$ increases to the sum of the forward voltage of the LED string 220A and the forward voltage of the LED string 220B, the current regulator 208A turns off the switch Q1 under control of the controller 201, and the current regulator 208B linearly controls the switch Q2. Accordingly, the current through the LED string 220A and LED string 220B is regulated to a second value I2. Afterwards, if the DC voltage $V_{DC}$ decreases to less than the sum of the forward voltage of the LED string 220A and the forward voltage of the LED string 220B but remains greater than the forward voltage of the LED string 220A, the current regulator 208A linearly controls the switch Q1, and the current regulator 208B turns off the switch Q2, under control of the controller 210. Again, the current through the LED string 220A is regulated to the first value I1, and the current through the LED string 220B is zero. As described above, in response to different levels of the DC voltage $V_{DC}$, control circuitry (including the current regulator 208A, the current regulator 208B, and the controller 210) selectively turns on the switch Q1 or the switch Q2. As such, the power efficiency of the driving circuit 200 is improved.

According to the operation of the driving circuit 200, in an embodiment, the status of the light sources is either a first status or a second status. In the first status, the switch Q1 is on and the switch Q2 is off, and only the LED string 220A is turned on. In the second status, the switch Q1 is off and the switch Q2 is on, and both the LED string 220A and the LED string 220B are turned on. It is desired that the switching between these two statuses is not noticeable to a user. In other words, it is desired that the output power of the light sources is substantially constant despite the switching between the two statuses such that the variation of the brightness of the light sources is not noticeable. In one embodiment of the invention, this can be achieved by properly selecting a ratio of the resistance of the resistors R1 to the resistance of the resistor R2, which is described below in FIG. 3. In another embodiment of the invention, this can be achieved by properly selecting a ratio of a first current reference received by the current regulator 208A to a second current reference received by the current regulator 208B, which is described below in FIG. 4.

Figure 3:
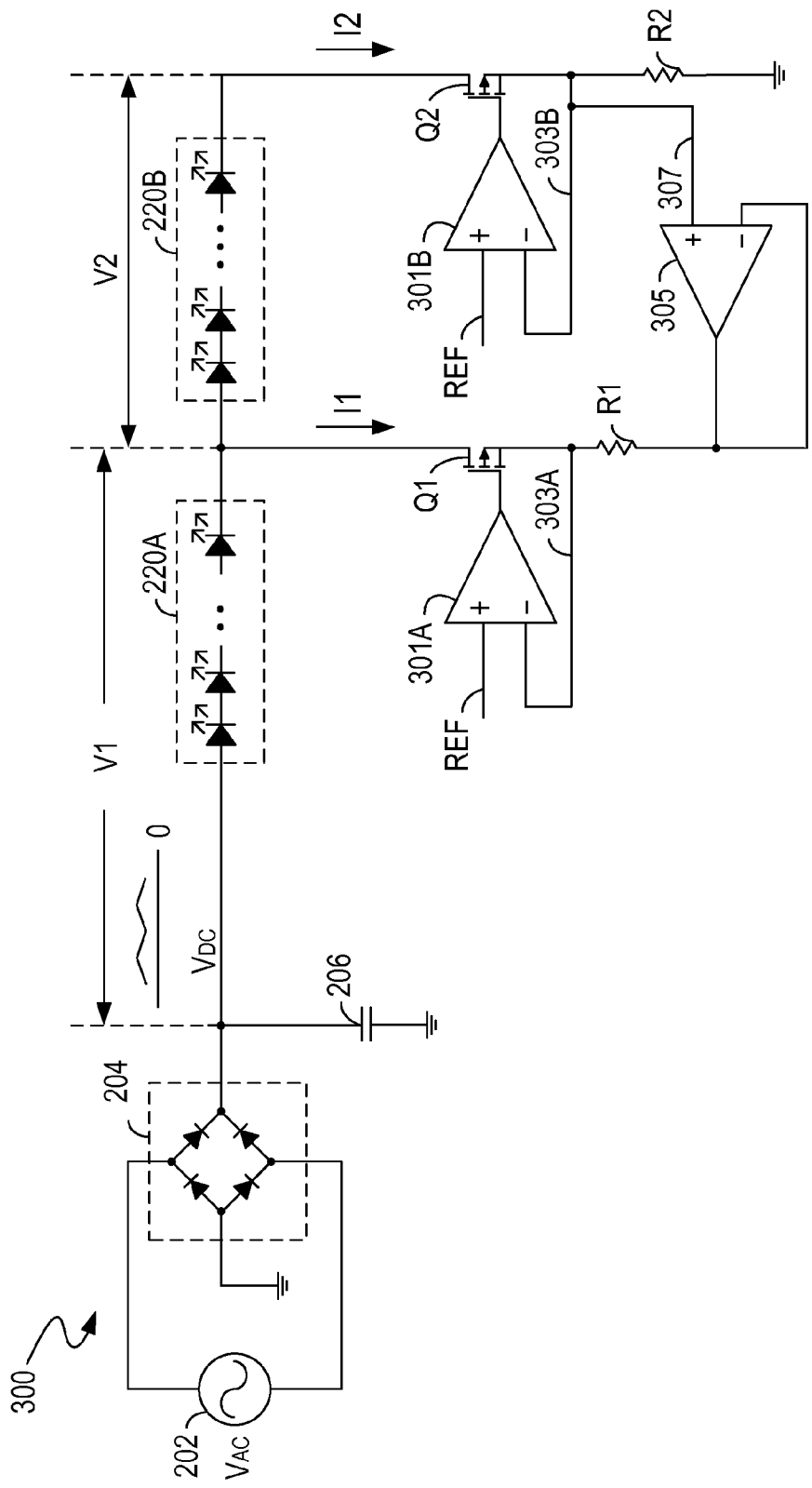
FIG. 3 shows a light source driving circuit, in accordance with another embodiment of the present invention.

FIG. 3 shows a light source driving circuit 300, in accordance with another embodiment of the present invention. Elements labeled the same as in FIG. 2 have similar functions. In the example of FIG. 3, the driving circuit 300 includes a rectifier 204, a capacitor 206, operational amplifiers 301A and 301B (which act as the current regulators 208A and 208B in FIG. 2, respectively), switches Q1 and Q2 which are respectively coupled in series with LED strings 220A and 220B, current sensing resistors R1 and R2, and an operational amplifier 305 (which acts as the controller 210 in FIG. 2).

A non-inverting input of the operational amplifier 301A receives a current reference REF. An inverting input of the operational amplifier 301A is coupled to a common node between the switch Q1 and the resistor R1, and receives a sensing signal 303A which indicates a current through the LED string 220A. An output of the operational amplifier 301A is coupled to the switch Q1 and linearly controls the switch Q1 based on the current reference REF and the sensing signal 303A to regulate the current through the LED string 220A. A non-inverting input of the operational amplifier 301B receives the current reference REF. An inverting input of the operational amplifier 301B is coupled to a common node between the switch Q2 and the resistor R2, and receives a sensing signal 303B which indicates a current through the LED string 220A and the LED string 220B. An output of the operational amplifier 301B is coupled to the switch Q2 and linearly controls the switch Q2 based on the current reference REF and the sensing signal 303B to regulate the current through the LED string 220A and the LED string 220B. An inverting input and an output of the operational amplifier 305 are both coupled to the resistor R1 and the switch Q1. A non-inverting input of the operational amplifier 305 is coupled to a common node between the resistor R2 and the switch Q2. Control circuitry including the operational amplifiers 301A, 301B, and 305 controls the switch Q1 and Q2 to control the current through the LED string 220A and/or the LED string 220B.

In the example of FIG. 3, the operational amplifier 301A and the operational amplifier 301B receive a same current reference REF. Assume that the forward voltage V1 of the LED string 220A is 250V and the forward voltage V2 of the LED string 220B is 50V.

In a first situation, if the DC voltage $V_{DC}$ is less than the forward voltage of the LED string 220A, e.g., $V_{DC}<250V$, then a current flowing through the LED string 220A and the switch Q1 to the ground of the operational amplifier 305 increases exponentially with the increment of the DC voltage $V_{DC}$ according to the current-voltage characteristic of LEDs.

In a second situation, if the DC voltage $V_{DC}$ is greater than or equal to the forward voltage V1 of the LED string 220A and less than the sum of the forward voltage of the LED string 220A and the forward voltage of the LED string 220B, e.g., $250V \leq V_{DC} < 300V$, then the operational amplifier 301A linearly controls the switch Q1 and regulates the current flowing through the LED string 220A to the first value I1. The operational amplifier 301B keeps the switch Q2 off such that the current flowing through the LED string 220B is zero. The inverting input, non-inverting input, and the output of the operational amplifier 305 are all zero and can be regarded as grounded.

In this second situation, because the switch Q1 is on and the switch Q2 is off, the output power of the light sources is the output power of the LED string 220A, and can be calculated by $$P2 = V1 \times I1 = 250 \times REF/r1, \quad (1)$$

where r1 is the resistance of the resistor R1.

In a third situation, if the DC voltage $V_{DC}$ is greater than or equal to the sum of the forward voltage of the LED string 220A and the forward voltage of the LED string 220B, e.g., $V_{DC} \geq 300V$, then the operational amplifier 301B linearly controls the switch Q2 and regulates the current flowing through the LED string 220A and the LED string 220B to the second value I2. In one embodiment, the resistors R1 and R2 have different resistance. For example, the resistance r2 of the resistor R2 is greater than the resistance r1 of the resistor R1. According to the characteristic of an operational amplifier, I1=REF/r1 and I2=REF/r2, therefore the second value I2 is less than the first value I1. The non-inverting input of the operational amplifier 305 receives a sensing signal 307 indicating a current through the LED string 220A and the LED string 220B which is regulated to the second value I2. According to the characteristic of an operational amplifier, the inverting input, the non-inverting input, and the output of the operational amplifier 305 are all equal to the current reference REF such that the operational amplifier 301A turns off the switch Q1. As such, the switch Q1 or the switch Q2 is selectively turned on.

In this third situation, because the switch Q1 is off and the switch Q2 is on, the output power of the light sources is the total output power of the LED string 220A and the LED string 220B, and can be calculated by $$P3 = (V1+V2) \times I2 = 300 \times REF/r2. \quad (2)$$

If it is desired that the output power of the light sources is substantially constant, then P2 should be equal to P3. According to equations (1) and (2), it can be deduced that $$r1/r2 = V1/(V1+V2) = 5/6. \quad (3)$$

As can be seen above, if the resistance of the resistors R1 and R2 are properly selected according to the forward voltages of the LED string 220A and the LED string 220B, the output power of the light sources can be maintained substantially constant such that the variation of the brightness of the light sources can be neglected. For example, the resistance of the resistor R1 can be 50 ohms and the resistance of the resistor R2 can be 60 ohms.

Furthermore, if the AC voltage $V_{AC}$ has a typical value of 230V, then the corresponding DC voltage $V_{DC}$ is 230× 1.414=325V. The power efficiency of the driving circuit 300 can be calculated by $$Eff = (V1+V2)/V_{DC} = 300/325 = 92.3\%. \quad (4)$$

Figure 1:
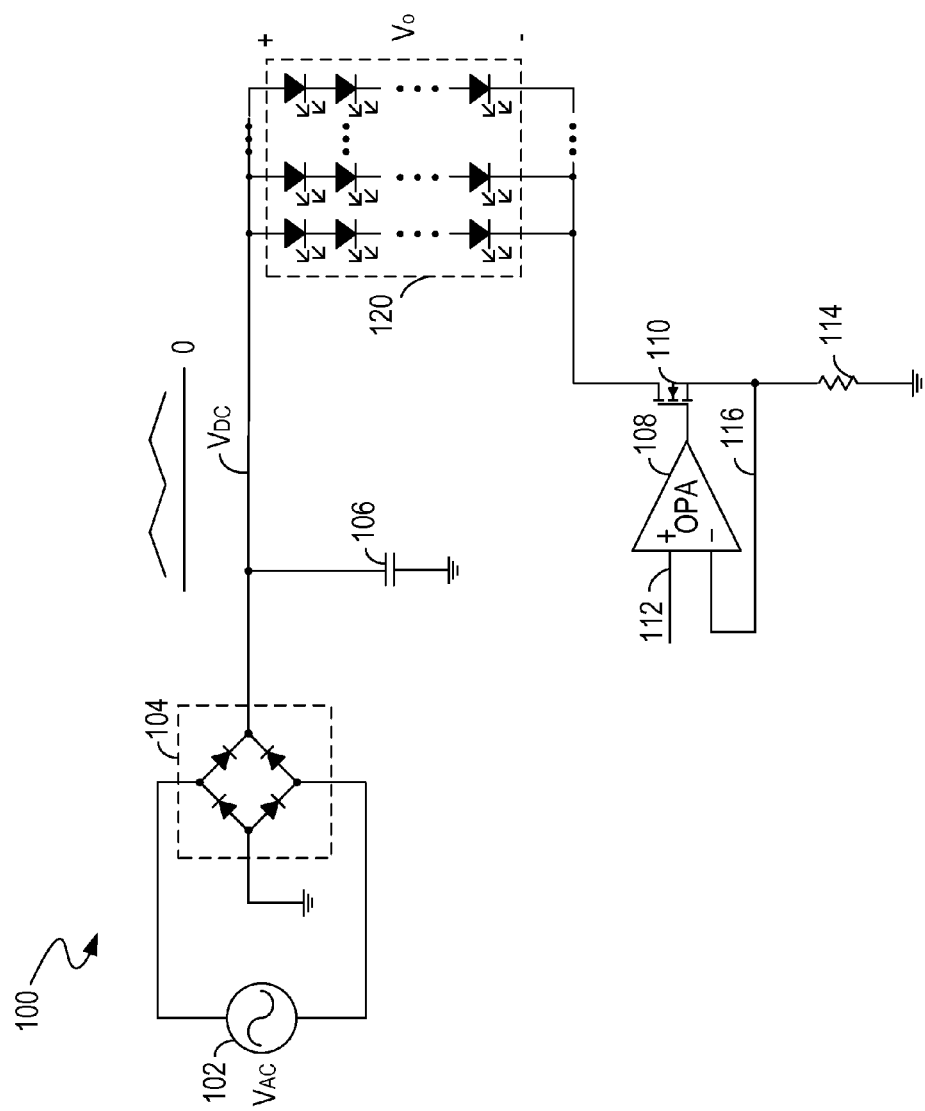
FIG. 1 illustrates a conventional light source driving circuit.

In contrast, the power efficiency of the conventional driving circuit 100 in FIG. 1 is 250/325=77%. Therefore, driving circuits according to present invention can increase the power efficiency if the AC voltage $V_{AC}$ is relatively high.

In a fourth situation, if the DC voltage $V_{DC}$ decreases to a level that is less than the sum of the forward voltage of the LED string 220A and the forward voltage of the LED string 220B but remains greater than or equal to the forward voltage V1 of the LED string 220A, e.g., $250V \leq V_{DC} < 300V$, similar to the second situation, then the operational amplifier 301A linearly controls the switch Q1 and regulates the current flowing through the LED string 220A to the first value I1. The operational amplifier 301B keeps the switch Q2 off such that the current flowing through the LED string 220B is zero. As described above, by properly selecting the resistance of the resistors R1 and R2, the switching between statuses (e.g., only one LED string on or both (two) LED strings on) is not noticeable to a user. The variation of the brightness of the light sources is negligible.

In a fifth situation, if the DC voltage $V_{DC}$ decreases to a level that is less than the forward voltage of the LED string 220A, e.g., $V_{DC} < 250V$, then the current flowing through the LED string 220A decreases exponentially with the decrement of the DC voltage $V_{DC}$ until reaching zero.

Figure 4:
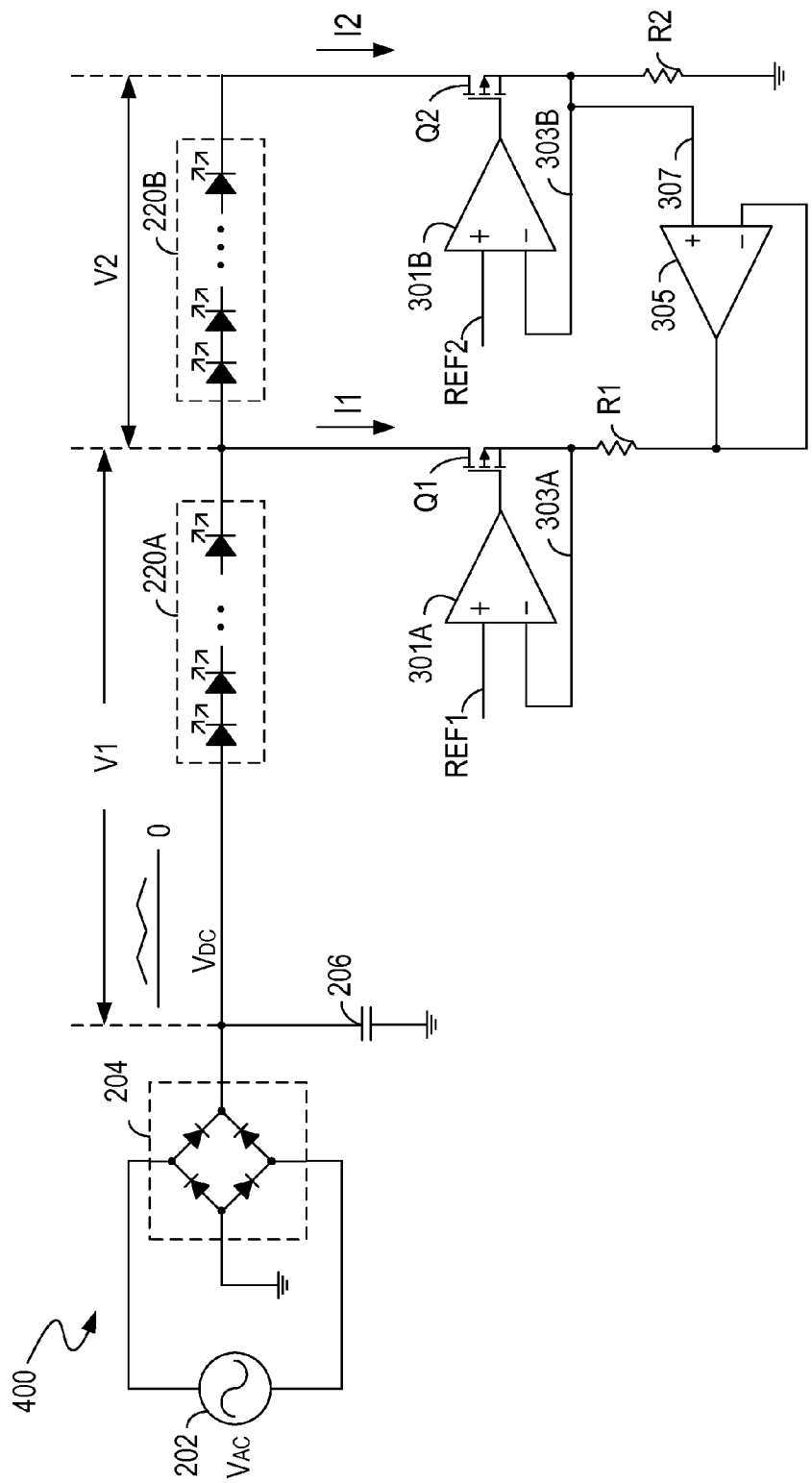
FIG. 4 shows a light source driving circuit, in accordance with another embodiment of the present invention.

FIG. 4 shows a light source driving circuit 400, in accordance with another embodiment of the present invention. Elements labeled the same as in FIG. 2 and FIG. 3 have similar functions. In contrast to the example in FIG. 3, the resistance of the resistors R1 and R2 in FIG. 4 are the same, which are both assumed to be r3. A non-inverting input of the operational amplifier 301A receives a first current reference REF1. A non-inverting input of the operational amplifier 301B receives a second current reference REF2.

In the aforementioned second situation where the DC voltage $V_{DC}$ is greater than or equal to the forward voltage V1 of the LED string 220A and less than the sum of the forward voltage of the LED string 220A and the forward voltage of the LED string 220B, e.g., $250V \leq V_{DC} < 300V$, the operational amplifier 301A linearly controls the switch Q1 and regulates the current flowing through the LED string 220A to the first value I1. The operational amplifier 301B keeps the switch Q2 off such that the current flowing through the LED string 220B is zero. The inverting input, non-inverting input and the output of the operational amplifier 305 are all zero and can be regarded as grounded.

In this second situation, because the switch Q1 is on and the switch Q2 is off, the output power of the light sources is the power of the LED string 220A and can be calculated by $$P2'=V1 \times I1 = 250 \times REF/r3, \quad (5)$$

where r3 is the resistance of the resistor R1.

In the aforementioned third situation where the DC voltage $V_{DC}$ is greater than or equal to the sum of the forward voltage of the LED string 220A and the forward voltage of the LED string 220B, e.g., $V_{DC}$300V, the operational amplifier 301B linearly controls the switch Q2 and regulates the current flowing through the LED string 220A and the LED string 220B to the second value I2. The non-inverting input of the operational amplifier 305 receives a sensing signal 307 indicating a current through the LED string 220A and the LED string 220B which is regulated to the second value I2. According to the characteristic of an operational amplifier, the inverting input, the non-inverting input and the output of the operational amplifier 305 are all equal to the current reference REF2 such that the operational amplifier 301A turns off the switch Q1. As such, the switch Q1 or the switch Q2 is selectively turned on.

In this third situation, because the switch Q1 is off and the switch Q2 is on, the output power of the light sources is the total output power of the LED string 220A and the LED string 220B, and can be calculated by $$P3'=(V1+V2) \times I2 = 300 \times REF2/r3, \quad (6)$$

where r3 is the resistance of the resistor R2.

If it is desired that the output power of the light sources is substantially constant, then P2' should be equal to P3'. According to equations (5) and (6), it can be deduced that $$REF1/REF2=(V1+V2)/V1. \quad (7)$$

As can be seen above, if the first current reference REF1 and the second current reference REF2 are properly selected according to the forward voltages of the LED string 220A and the LED string 220B, the power of the light sources can be maintained substantially constant such that the variation of the brightness of the light sources is negligible.

Advantageously, the control circuitry including the operational amplifiers 301A, 301B, and 305 selectively turns on and controls the switch Q1 and Q2 such that the power efficiency of the driving circuits 300 and 400 are increased.

Specifically, if the DC voltage $V_{DC}$ is within a first range, e.g., $V1 \leq V_{DC} < (V1+V2)$, then the operational amplifier 301A linearly controls the switch Q1 and regulates the current flowing through the LED string 220A to the first value I1. The LED string 220A is on and the LED string 220B is off. If the DC voltage $V_{DC}$ is within a first range, e.g., $V_{DC} \geq (V1+V2)$, then the operational amplifier 301B linearly controls the switch Q2 and regulates the current flowing through the LED strings 220A and 220B to the second value I2. The LED strings 220A and 220B are both turned on. More importantly, by properly selecting the resistance of the resistors R1 and R2 or by properly selecting the first current reference REF1 and the second current reference REF2, the switching between statuses of the light sources (e.g., only one LED string on or both (two) LED strings on) is not noticeable to a user. The variation of the brightness of the light sources is negligible.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A light source driving circuit for powering a first light source and a second light source by a DC (direct current) voltage, comprising:
    a first current regulator, coupled to said first light source, operable for controlling a first switch coupled to said first light source based on a first current reference and a first sensing signal indicating a current flowing through said first light source;
    a second current regulator, coupled to said second light source, operable for controlling a second switch coupled to said second light source based on a second current reference and a second sensing signal indicating a current flowing through said second light source;
    a controller operable for regulating said current flowing through said first light source and said current flowing through said second light source by controlling said first current regulator and said second current regulator, wherein if said DC voltage is within a first range, then said controller turns on said first light source, and if said DC voltage is within a second range, then said controller turns on said first light source and said second light source,
    a first current sensor operable for providing said first sensing signal, wherein said first current sensor comprises a first resistor having a first resistance; and
    a second current sensor operable for providing said second sensing signal, wherein said second current sensor comprises a second resistor having a second resistance,
    wherein said first current reference is equal to said second current reference, said first light source comprises a first number of light emitting diodes having a first forward voltage and said second light source comprises a second number of light emitting diodes having a second forward voltage, and a ratio of said first resistance to said second resistance is equal to a ratio of said first forward voltage to a sum of said first forward voltage and said second forward voltage.

2. The light source driving circuit of claim 1, wherein said first number is greater than said second number.

3. The light source driving circuit of claim 1, wherein if said DC voltage is within said first range then said DC voltage is greater than said first forward voltage and less than a sum of said first forward voltage and said second forward voltage and said first current regulator regulates said current flowing through said first light source to a first value, and
    wherein if said DC voltage is within said second range then said DC voltage is greater than a sum of said first forward voltage and said second forward voltage and said second current regulator regulates said current flowing through said first light source and said current flowing through said second light source to a second value, wherein said second value is less than said first value.

4. The light source driving circuit of claim 1, wherein said first current regulator comprises a first operational amplifier, a non-inverting input of said first operational amplifier receives said first current reference, an inverting input of said first operational amplifier receives said first sensing signal, and an output of said first operational amplifier controls said first switch based on said first current reference and said first sensing signal, wherein said second current regulator comprises a second operational amplifier, a non-inverting input of said second operational amplifier receives said second current reference, an inverting input of said second operational amplifier receives said second sensing signal, and an output of said second operational amplifier controls said second switch based on said second current reference and said second sensing signal, and wherein said controller comprises a third operational amplifier, a non-inverting input of said third operational amplifier is coupled to said second switch, and an inverting input and an output of said third operational amplifier are coupled to said first switch.

5. A light source driving circuit for powering a first light source and a second light source by a DC (direct current) voltage, comprising:

a first current regulator, coupled to said first light source, operable for controlling a first switch coupled to said first light source based on a first current reference and a first sensing signal indicating a current flowing through said first light source;

a second current regulator, coupled to said second light source, operable for controlling a second switch coupled to said second light source based on a second current reference and a second sensing signal indicating a current flowing through said second light source;

a controller operable for regulating said current flowing through said first light source and said current flowing through said second light source by controlling said first current regulator and said second current regulator, wherein if said DC voltage is within a first range, then said controller turns on said first light source, and if said DC voltage is within a second range, then said controller turns on said first light source and said second light source, a first current sensor operable for providing said first sensing signal, wherein said first current sensor comprises a first resistor; and a second current sensor operable for providing said second sensing signal, wherein said second current sensor comprises a second resistor, wherein a resistance if said first resistor is equal to a resistance of said second resistor, said first light source comprises a first number of light emitting diodes having a first forward voltage, said second light source comprises a second number of light emitting diodes having a second forward voltage, and a ratio of said first current reference to said second current reference is equal to a ratio of a sum of said first forward voltage and said second forward voltage to said first forward voltage.

6. The light source driving circuit of claim 5, wherein if said DC voltage is within said first range then said DC voltage is greater than said first forward voltage and less than a sum of said first forward voltage and second forward voltage and said first current regulator regulates said current flowing through said first light source to a first value, and wherein if said DC voltage is within said second range then said DC voltage is greater than a sum of said first forward voltage and said second forward voltage and said second current regulator regulates said current flowing through said first light source and said current flowing through said second light source to a second value, wherein said second value is less than said first value.

7. The light source driving circuit of claim 5, wherein said first number is greater than said second number.

8. The light source driving circuit of claim 5, wherein said first current regulator comprises a first operational amplifier, a non-inverting input of said first operational amplifier receives said first current reference, an inverting input of said first operational amplifier receives said first sensing signal, and an output of said first operational amplifier controls said first switch based on said first current reference and said first sensing signal, wherein said second current regulator comprises a second operational amplifier, a non-inverting input of said second operational amplifier receives said second current reference, an inverting input of said second operational amplifier receives said second sensing signal, and an output of said second operational amplifier controls said second switch based on said second current reference and said second sensing signal, and wherein said controller comprises a third operational amplifier, a non-inverting input of said third operational amplifier is coupled to said second switch, and an inverting input and an output of said third operational amplifier are coupled to said first switch.

9. A light source driving circuit for driving a first light source and a second light source, comprising:

a rectifier operable for rectifying an AC (alternating current) voltage to a rectified AC voltage;

a capacitor, coupled to said rectifier, operable for filtering said rectified AC voltage and providing a DC (direct current) voltage;

a first switch coupled to said first light source;

a first current sensor, coupled to said first light source, operable for sensing a current flowing through said first light source and providing a first sensing signal;

a first current regulator, coupled to said first light source, operable for controlling said first switch to regulate said current flowing through said first light source based on a first current reference and said first sensing signal;

a second switch coupled to said second light source;

a second current sensor, coupled to said second current source, operable for sensing a current flowing through said second light source and providing a second sensing signal;

a second current regulator, coupled to said second light source, operable for controlling said second switch to regulate said current flowing through said second light source based on a second current reference and said second sensing signal; and a controller, coupled to said first current sensor and said second current sensor, operable for regulating said current flowing through said first light source and said current flowing through said second light source by controlling said first current regulator and said second current regulator, wherein if said DC voltage is within a first range, said controller turns on said first light source, wherein if said DC voltage is within a second range, said controller turns on said first light source and said second light source, wherein: said first light source comprises a first number of light emitting diodes having a first forward voltage and said second light source comprises a second number of light emitting diodes having a second forward voltage, said first current reference is equal to said second current reference, said first current sensor comprises a first resistor having a first resistance, said second current sensor comprises a second resistor having a second resistance, and a ratio of said first resistance to said second resistance is equal to a ratio of said first forward voltage to a sum of said first forward voltage and said second forward voltage.

10. The light source driving circuit of claim 9, wherein said first number is greater than said second number.

11. The light source driving circuit of claim 9, wherein if said DC voltage is within said first range then said DC voltage is greater than said first forward voltage and less than a sum of said first forward voltage and said second forward voltage and said first current regulator regulates said current flowing through said first light source to a first value, and wherein if said DC voltage is within said second range then said DC voltage is greater than a sum of said first forward voltage and said second forward voltage and said second current regulator regulates said current flowing through said first light source and said current flowing through said second light source to a second value, wherein said second value is less than said first value.

12. The light source driving circuit of claim 9, wherein said first current regulator comprises a first operational amplifier, a non-inverting input of said first operational amplifier receives said first current reference, an inverting input of said first operational amplifier receives said first sensing signal, and an output of said first operational amplifier controls said first switch based on said first current reference and said first sensing signal, wherein said second current regulator comprises a second operational amplifier, a non-inverting input of said second operational amplifier receives said second current reference, an inverting input of said second operational amplifier receives said second sensing signal, and an output of said second operational amplifier controls said second switch based on said second current reference and said second sensing signal, and wherein said controller comprises a third operational amplifier, a non-inverting input of said third operational amplifier is coupled to said second current sensor, and an inverting input and an output of said third operational amplifier are coupled to said first current sensor.

13. A light source driving circuit for driving a first light source and a second light source, comprising:
a rectifier operable for rectifying an AC (alternating current) voltage to a rectified AC voltage;
a capacitor, coupled to said rectifier, operable for filtering said rectified AC voltage and providing a DC (direct current) voltage;
a first switch coupled to said first light source;
a first current sensor, coupled to said first light source, operable for sensing a current flowing through said first light source and providing a first sensing signal;
a first current regulator, coupled to said first light source, operable for controlling said first switch to regulate said current flowing through said first light source based on a first current reference and said first sensing signal;
a second switch coupled to said second light source;
a second current sensor, coupled to said second current source, operable for sensing a current flowing through said second light source and providing a second sensing signal;
a second current regulator, coupled to said second light source, operable for controlling said second switch to regulate said current flowing through said second light source based on a second current reference and said second sensing signal; and
a controller, coupled to said first current sensor and said second current sensor, operable for regulating said current flowing through said first light source and said current flowing through said second light source by controlling said first current regulator and said second current regulator, wherein if said DC voltage is within a first range, said controller turns on said first light source, wherein if said DC voltage is within a second range, said controller turns on said first light source and said second light source, wherein: said first light source comprises a first number of light emitting diodes having a first forward voltage, said second light source comprises a second number of light emitting diodes having a second forward voltage, said first current sensor comprises a first resistor, said second current sensor comprises a second resistor, a resistance of said first resistor is equal to a resistance of said second resistor, and a ratio of said first current reference to said second current reference is equal to a ratio of a sum of said first forward voltage and said second forward voltage to said first forward voltage.

14. The light source driving circuit of claim 13, wherein if said DC voltage is within said first range then said DC voltage is greater than said first forward voltage and less than a sum of said first forward voltage and said second forward voltage and said first current regulator regulates said current flowing through said first light source to a first value, and wherein if said DC voltage is within said second range then said DC voltage is greater than a sum of said first forward voltage and said second forward voltage and said second current regulator regulates said current flowing through said first light source and said current flowing through said second light source to a second value, wherein said second value is less than said first value.

15. The light source driving circuit of claim 13, wherein said first number is greater than said second number.

16. The light source driving circuit of claim 13, wherein said first current regulator comprises a first operational amplifier, a non-inverting input of said first operational amplifier receives said first current reference, an inverting input of said first operational amplifier receives said first sensing signal, and an output of said first operational amplifier controls said first switch based on said first current reference and said first sensing signal, wherein said second current regulator comprises a second operational amplifier, a non-inverting input of said second operational amplifier receives said second current reference, an inverting input of said second operational amplifier receives said second sensing signal, and an output of said second operational amplifier controls said second switch based on said second current reference and said second sensing signal, and wherein said controller comprises a third operational amplifier, a non-inverting input of said third operational amplifier is coupled to said second current sensor, and an inverting input and an output of said third operational amplifier are coupled to said first current sensor.

* * * * *